March 26, 1946.　　J. N. SCHICHTEL　　2,397,293
FIRE HOSE RACK
Filed Aug. 29, 1944
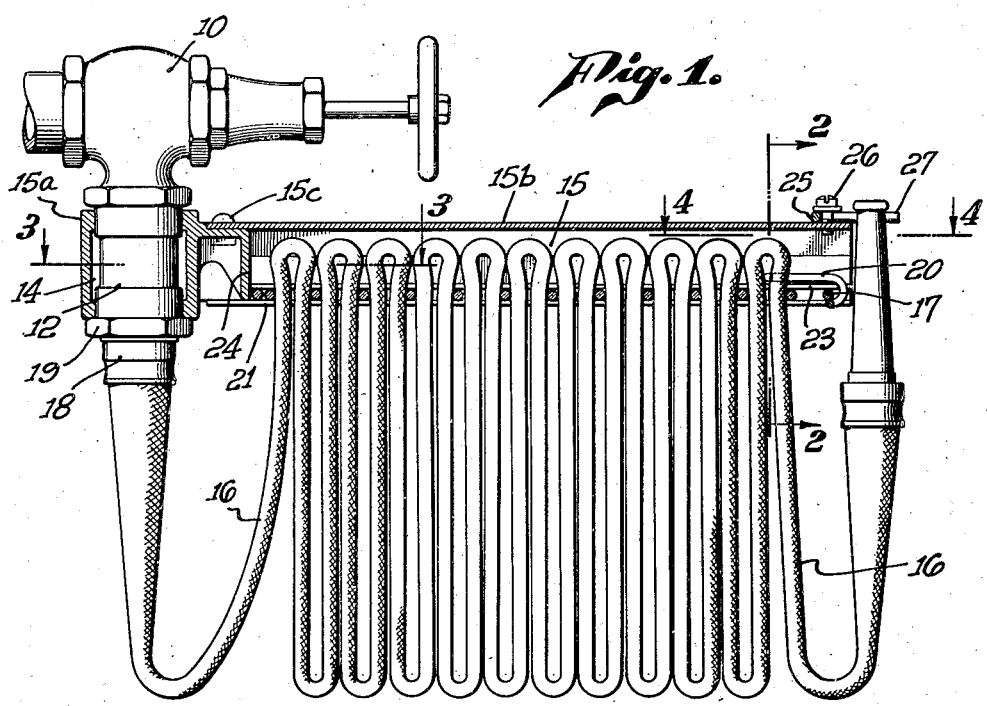
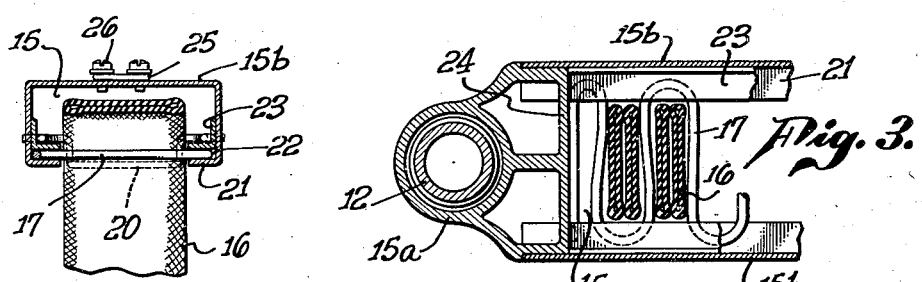
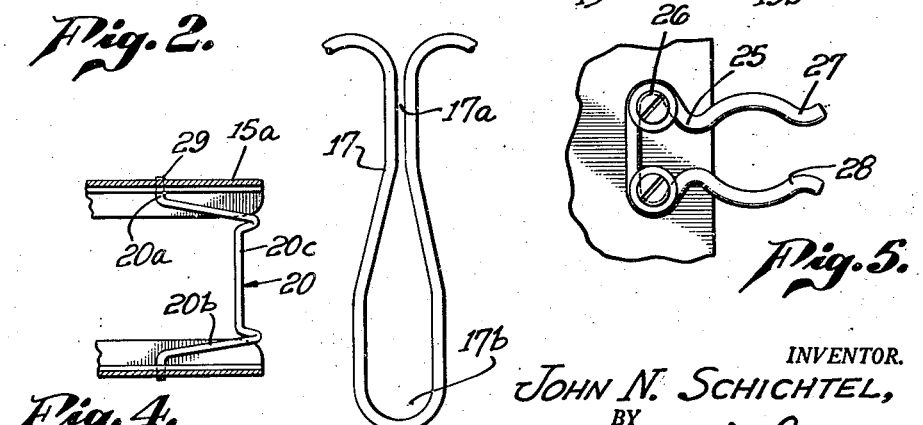
INVENTOR.
JOHN N. SCHICHTEL,
BY
Ross J. Garofalo
ATTORNEY.

Patented Mar. 26, 1946

2,397,293

UNITED STATES PATENT OFFICE 2,397,293

FIRE HOSE RACK

John N. Schichtel, San Gabriel, Calif.

Application August 29, 1944, Serial No. 551,718

3 Claims. (Cl. 248—90)

The present invention relates to hose supporting devices and more particularly, has to do with those racks for supporting folded linen fire hose.

In many of the hose racks in use today, the hose is generally supported on pins extending from one arm of the frame to the other. The upper portions of the folds of the hose are usually looped over the pins extending from one arm of the frame to the other in such manner that a pull on the free or nozzle end of the hose permits the hose to be paid out from the rack to the point of use. Some of the prior types of hose racks are so constructed that a simple spreading of the arms of the frame allows the entire hose to fall out of the rack together with all of the pins with the result that the hose becomes entangled and some of the pins are lost. To avoid loss of pins, some hose rack manufacturers hinge one end of the pins on one of the arms of the frame and allow the other ends to be supported by the other arm. Many other improvements have been made on these types of hose racks but all depend upon looping the folds of the hose over the pins in order to support the hose. One great disadvantage of this type of hose rack resides in the great inconvenience in carefully placing the hose in the rack. Another disadvantage resides in the fact that the least jarring or twisting of the hose in the rack by meddlers results in the complete removal of the banded hose from the rack. This is particularly true when the hose is soft due to use or age. Another disadvantage is the entanglement of the hose when pulled out of the rack and one of the greatest disadvantages resides in the fact that the operator must completely pay-out the hose from the rack before it is possible to turn on the water.

It is thus a primary object of my invention to provide a rack for supporting folded linen hose which comprises few and simple parts, which is not likely to get out of order, from which the linen hose may be readily and instantly detached without danger of becoming entangled, and upon which the hose may be easily, conveniently and compactly supported in the rack.

It is a further object of my invention to provide a hose rack that is simple in construction, cheap to produce and which can be readily mounted on a water pipe without danger of impairing its operation.

Another object of my invention is to provide a hose rack of such construction that when the hose is placed in position in the rack, the hose will not be readily jarred or twisted from its fixed position when anyone meddles with the hose or rack.

Another object of the invention is to devise a rack in which the hose may be replaced without necessity of removing the frame from its supporting nipple.

Another object of my invention is to provide a hose rack which will permit the water to be turned on when the hose is in place in the rack without danger of entanglement of the hose.

Briefly stated, my invention resides in a hose supporting device comprising a frame provided with a spring for supporting the folds of the hose.

More specifically, the hose supporting device forming the subject matter of my invention comprises a frame provided with a flat spring forming a series of joined or continuous sigmoids which is adapted to slide in and be supported in a horizontal place by grooves provided in the inner side of the arms of the frame, said spring being adapted to receive and support the folds of the hose. The open ends of the sigmoids forming the flat spring are narrow in comparison with the loops or closed ends so that a fold of hose may be inserted in the open end and be extended into the loops. The folds may thus be supported in the openings of the spring by the tension of the spring at the narrow portion of the openings. Means are provided on one end of the frame for locking the spring in the frame. Also, means are provided on the frame for supporting the nozzle of the hose in an upright position.

Other objects, advantages and features of novelty and construction will appear from the following detailed description taken in connection with the accompanying drawing forming part of the specification in which:

Fig. 1 is a side elevation of the hose rack showing the same as supporting the hose;

Fig. 2 is an end view taken on line 2—2 of Fig. 1;

Fig. 3 is an end view taken on line 3—3 of Fig. 1;

Fig. 4 is a plan view of the frame showing the portion shown in Fig. 1 by lines 4—4;

Fig. 5 is a plan view of the end of the frame with, however, the nozzle not being shown in the supporting jaws;

Fig. 6 is a plan view of a portion of the spring for supporting the hose in the frame of the rack showing the shape of the spring when a fold of the hose is not placed therein.

Referring more particularly to the drawing, the reference number 10 designates an outlet valve which generally emerges from a wall of a building where the fire hose rack is positioned. This valve is used to control the flow of water from the standpipe through a union or nipple 12. Nipple 12 passing through a hole 14 provided in the frame also supports a frame 15 and hose 16 which is in position as it will be held by spring 17 when in place. The hose rack assembly is adapted to swing in a horizontal place about the nipple 12, being limited only in its movement by the walls adjacent the rack. Hose 16 is secured to the nipple by means of a coupling 18. A nut 19 is threaded to one end of the nipple 12 and serves to support the frame 15. The frame is provided with a locking clip 20 which serves to lock the spring in the frame.

Frame 15 is preferably made in two parts, generally termed here as the nipple portion 15a and the spring retaining portion 15b. The nipple portion of the frame is preferably made of cast iron, steel, bronze, etc. while the spring retaining portion 15b is preferably stamped from thin sheet metal into an elongated substantially C shaped channel as shown in Fig. 2 with the ends 21 of the flanges of the channel being bent inwardly to form partial webs 21. These partial webs provide the lower sides of grooves 22 and the lower guides for spring 17. The upper sides of the grooves 22 are provided by spot welding or otherwise fastening to the inner flanges of the channel frame, sections of angles 23 which extend for substantially the entire length of the spring retaining portion of the frame or channel. These form the upper guides for spring 17. The width of the grooves are generally slightly larger than the thickness of the hose retaining spring element 17. The spring retaining portion 15b is secured to the nipple portion of the frame by means of rivets 15c which may be provided across the top and along both sides of the frame. Instead of employing rivets to joint both portions of the frame, other means may be used such as bolts, screws, or welding. The spring retaining portion 15b of the frame serves as a cover for the linen hose when in place, preventing dust, dirt, moisture, etc. from accumulating on the upper part of the folded hose thus eliminating rotting of this portion of the hose.

The element 17 is a flat spring having a series of joined or continuous sigmoids and which is supported between the locking clip 20 and the inner portion 24 of the nipple portion 15a of the frame. The flat spring is adjusted to slide in the frame in the grooves 22 which as described above, are provided on the inner surfaces of each side of the spring retaining portion 15a of the frame. The spring element 17 is of such length that when the hose is placed in the spaces provided by the joined sigmoids, it will fit snugly between portion 24 and the locking clip 20. In other words, when the spring is placed in the rack without the hose, a sufficient amount of play is permitted so that when the folds of the hose are secured in the open spaces of the spring, thus extending the length of the spring, the assembly will rest between portion 24 and clip 20 without any or little play and preferably under a slight tension. Preferably, none of the folds of the hose are placed in the end loops or open spaces of the spring 17.

Referring again to the spring 17, as stated previously, it is shaped into a series of joined or continuous sigmoids, these forming narrow spaces 17a and wide spaces 17b for the insertion of the folds of the hose. The narrow portions of the joined sigmoids are adjacent the wide portions of adjacent sigmoids. The width of the space 17b is approximately the same width as the folds of the hose while the width of the fold of the space 17a is smaller than the width of the fold of the hose so that a tension is caused to be placed on the fold when it is inserted in the opening. When the spring is in a contracted position, that is, when the hose is not retained by the spring, a pair of the joined sigmoids resembles the vertical section of a bottle as shown in Fig. 6. When the spring is extended as when the hose is placed in the narrow openings of the spring, it assumes the shape as shown in Fig. 3. The extreme ends of the spring are preferably straight so that they may present straight bearing surfaces against the inner wall 24 of the frame and the locking clip 20. The spring may be formed by twisting round spring wire into the shape described above.

At the top of the one end of the spring-retaining portion of the frame, I have provided a hose nozzle retaining element 25 which generally consists of a spring clip fastened to the top of the frame by means of screws 26. The spring clip contains two jaws 27 and 28 so spaced as to retain the constricted portion of the nozzle under a slight tension.

The locking clip 20 is a round spring wire bent into the shape shown in Fig. 4. In general, it consists of a U having the ends 20a bent outwardly and the arms 20b extending inwardly. The bar 20c of the clip and the ends 20a are substantially parallel. The bar 20c is offset downwardly from the arms 20b so as to form an abutment for the straight extreme end of the spring 17. The foregoing locking clip may be described as a substantially U shaped saddle clip. Each side of the frame is provided with a drilled hole 29 of slightly larger diameter than the diameter of the ends 20a of the locking clip in order to receive these ends of the locking clip. The holes are positioned above the groove 22 and preferably in alignment with or above the upper surface of the upper guide 23. To place the locking clip in the frame, it is merely necessary to press the arms 20b towards each other until the ends 20a may be placed in the holes. By releasing the tension on the arms 20b the clip will be extended to its normal position and thus be retained in the holes. The locking clip is thus hinged in the holes 29 with its offset bar 20c being adapted to be moved in an arc limited only by the web of the channel.

In operation, in order to mount the hose in the rack, the spring is removed from the frame by merely raising the locking clip clear of the spring 17 and then sliding the spring out of the frame on grooves 22. The hose is then folded and the top end of each fold is inserted into the narrow openings 17a of the joined or continuous sigmoids, starting preferably with the second opening closest the end of the spring which when placed in the frame abuts the inner wall 24 of the frame. The insertion of the folds of the hose is continued until they enter the wide portion 17b of the opening. In normal position, the folds of the hose are centrally spaced in each opening. Thus, it will be seen that in mounting the hose in the spring, it will be necessary to alternate the insertion of the folds. Preferably, the first opening and last openings of the spring 17 do not contain any fold of hose. When the mounting of the hose on the spring is completed, the assembly is slid back into the frame until the straight end of the spring abuts the inner wall 24. The locking clip 20 is then lowered so that the offset bar 20c of the locking clip extends below the straight end of the spring 17 allowing the flat spring to abut the cradle of the offset. The spring assembly containing the hose is thus locked in the frame. To lower the offset bar 20c of the clip below the straight end of the spring, it may be necessary to force the spring assembly against the inner wall 24 in order that the offset bar may be forced over the end of the spring. This is not an objectionable feature since it is preferable to have a slight tension against the folds of the hose as it prevents the hose from easily falling from the spring.

After the locking clip is engaged, the hose coupling is screwed onto the nipple and the nozzle is then supported in the jaws 27 and 28 of the spring clip 25.

In the event of fire or in other words, when it is desired to readily dismount the hose from the rack, the nozzle is removed from its supporting jaws and with the locking clip still in its locked position, it is merely necessary to pay the hose out by a slight downward pull on the hose. For the first two or three folds, it may be necessary to give the hose a slight extra pull downwardly as the tension of these folds is the greatest. After two or three of the folds have been dismounted, the removal of the remainder of the hose may be readily accomplished by merely pulling on the hose while walking to the point of use.

Due to the tension placed on the folds by the spring, it is possible to turn the water on before the hose is withdrawn from the rack. The tension of the spring pinches the upper ends of the folds to such an extent that it is impossible to cause water to pass through the hose until the very last fold is removed from the spring. This is a desirable advantage over racks heretofore employed where the folds are supported by pins since in such cases, it is necessary to pay out the hose first before turning on the water, otherwise the hose will become entangled and may fly out of the rack toward the operator.

From the above, it will be seen that I have provided a hose rack which is simple in construction, which may be manufactured at low cost, and on which the hose may be easily mounted or removed.

The foregoing description of my invention is merely exemplary of one modification of my invention and is not to be considered as limiting since obviously many modifications thereof may be made without departing from the scope of the following claims.

I claim:

1. In a hose rack comprising a frame, a horizontal groove on each arm of said frame, a flat spring shaped into a series of joined sigmoids, said joined sigmoids forming alternating openings into which the folds of hose may be inserted, said openings being narrow at one end and wider at the other end and said spring being adapted to slide in and be supported by the horizontal grooves in the arms of said frame, means on said frame for locking the spring in said grooves, an improvement in said means for locking said spring which consists of a substantially U shaped saddle clip.

2. In a hose rack comprising a substantially C shaped frame, a horizontal groove on the inside surface of each arm of said frame, a flat spring formed into a plurality of joined sigmoids, a pair of such joined sigmoids having a narrow opening extending into a larger closed space, said opening and space being adapted to receive a fold of hose, said entire spring being sufficiently resilient to permit the folds of hose to be placed in said openings and to place a tension on the folds of the hose and said spring being adapted to slide in said grooves of said frame and be supported in a horizontal plane thereby, and means for locking said spring on said frame, an improvement in said means for locking said spring which consists of a wire bent into a U having its ends bent outwardly to be received in holes on each flange of said frame and having the bar of the U offset downwardly to form a cradle for the end of said flat spring.

3. In a hose rack comprising a flat spring, a frame, one end of said frame being a channel having partial webs extending inwardly parallel to the web of said channel and forming a rest for said flat spring, angles on the inner side of each flange of said channel and having one side of said angles positioned above said inwardly extending partial webs to form grooves for said flat spring, said flat spring being formed into a plurality of joined sigmoids, a pair of such joined sigmoids having a narrow opening extending into a larger closed space, said opening and space being adapted to receive a fold of hose, said entire spring being sufficiently resilient to permit the folds of hose to be placed in said openings and to place a tension on the folds of the hose and said spring being adapted to slide in said grooves of said frame and be supported in a horizontal plane thereby, and means for locking said spring on said frame, an improvement in said means for locking said spring which consists of a wire bent into a U having its ends bent outwardly to be received in holes on each flange of said frame and having the bar of the U offset downwardly to form a cradle for the end of said flat spring.

JOHN N. SCHICHTEL.